(12) United States Patent
Jaramillo et al.

(10) Patent No.: US 12,249,899 B2
(45) Date of Patent: Mar. 11, 2025

(54) DEVICES, SYSTEMS, AND METHODS FOR REDUCING MAGNETIC PARTICLES IN A FLUID FLOW

(71) Applicant: Schlumberger Technology Corporation, Sugar Land, TX (US)

(72) Inventors: Juan Jose Jaramillo, Stonehouse (GB); Christopher Rowe, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/715,916

(22) PCT Filed: Apr. 14, 2023

(86) PCT No.: PCT/US2023/018618
§ 371 (c)(1),
(2) Date: Jun. 3, 2024

(87) PCT Pub. No.: WO2023/215091
PCT Pub. Date: Nov. 9, 2023

(65) Prior Publication Data
US 2024/0421667 A1    Dec. 19, 2024

Related U.S. Application Data

(60) Provisional application No. 63/364,192, filed on May 5, 2022.

(51) Int. Cl.
| H02K 9/26 | (2006.01) |
| E21B 37/02 | (2006.01) |
| E21B 41/00 | (2006.01) |
| H02K 9/19 | (2006.01) |

(52) U.S. Cl.
CPC ............... *H02K 9/26* (2013.01); *E21B 37/02* (2013.01); *E21B 41/00* (2013.01); *H02K 9/19* (2013.01)

(58) Field of Classification Search
CPC .. H02K 9/26; H02K 9/19; E21B 37/02; E21B 41/00
See application file for complete search history.

(56) References Cited

U.S. PATENT DOCUMENTS

| 4,743,364 | A | 5/1988 | Kyrazis | |
| 8,853,879 | B2 | 10/2014 | Rytlewski | |
| 10,116,178 | B2* | 10/2018 | Horii | H02K 1/28 |
| 10,658,895 | B2* | 5/2020 | Higashino | H02K 1/32 |
| 11,121,597 | B2* | 9/2021 | Ubelhart | H02K 21/14 |

(Continued)

FOREIGN PATENT DOCUMENTS

EP    0762606 B1    12/2000

OTHER PUBLICATIONS

Search Report and Written Opinion of International Patent Application No. PCT/US2023/018618 dated Jul. 25, 2023, 8 pages.

*Primary Examiner* — Pedro J Cuevas
(74) *Attorney, Agent, or Firm* — Jeffrey D. Frantz

(57) ABSTRACT

A downhole motor includes a primary fluid path between a housing and a rotor and a secondary fluid path between the rotor and a stator. Fluid is diverted from the primary fluid path through a secondary inlet to the secondary fluid path to lubricate the motor. A magnet is located proximate the secondary inlet to bias magnetic particles in the drilling fluid away from the secondary inlet.

17 Claims, 12 Drawing Sheets

(56) References Cited

U.S. PATENT DOCUMENTS

| | | | |
|---|---|---|---|
| 11,152,827 B2* | 10/2021 | Krais | H02K 1/276 |
| 11,418,077 B2* | 8/2022 | Krais | H02K 7/003 |
| 11,990,810 B2* | 5/2024 | Anvari | H02K 3/26 |
| 11,996,755 B2* | 5/2024 | Dewolf | F04C 18/16 |
| 2005/0200210 A1 | 9/2005 | Kotsonis | |
| 2008/0219844 A1 | 9/2008 | Decker | |
| 2011/0273040 A1* | 11/2011 | Chamberlin | H02K 1/32 |
| | | | 310/59 |
| 2014/0077632 A1* | 3/2014 | King | H02K 15/03 |
| | | | 29/598 |
| 2016/0261158 A1* | 9/2016 | Horii | H02K 1/32 |
| 2018/0091011 A1* | 3/2018 | Higashino | H02K 9/00 |
| 2020/0036248 A1* | 1/2020 | Krais | H02K 1/30 |
| 2020/0036249 A1* | 1/2020 | Krais | H02K 9/197 |
| 2020/0052536 A1* | 2/2020 | Ubelhart | B60K 6/48 |
| 2022/0271610 A1* | 8/2022 | Dewolf | F04C 29/045 |
| 2023/0092153 A1* | 3/2023 | Steinwandel | H02K 7/108 |
| | | | 310/54 |
| 2023/0283125 A1* | 9/2023 | Hori | H02K 9/19 |
| | | | 310/61 |
| 2023/0299634 A1* | 9/2023 | Mitteer | H02K 11/33 |
| | | | 417/410.4 |
| 2023/0352999 A1* | 11/2023 | Anvari | H02K 9/19 |
| 2023/0353000 A1* | 11/2023 | Anvari | H02K 3/26 |
| 2024/0235330 A1* | 7/2024 | Anvari | H02K 3/26 |
| 2024/0322625 A1* | 9/2024 | Schauer | H02K 15/00 |

* cited by examiner

DEVICES, SYSTEMS, AND METHODS FOR REDUCING MAGNETIC PARTICLES IN A FLUID FLOW

CROSS-REFERENCE TO RELATED APPLICATIONS

The subject disclosure is the National Stage Entry of International Application No. PCT/US2023/018618, filed Apr. 14, 2023, which claims priority from U.S. Provisional Appl. No. 63/364,192, filed on May 5, 2022, herein incorporated by reference in its entirety.

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled.

Many drilling methods utilize one or more downhole tools that utilize electric power. Electric power may be generated on the surface and transferred downhole. In some situations, electric power may be generated downhole. Downhole motors may utilize the flowing mass of drilling fluid to rotate a rotor about a stator and generate power downhole. The power generated downhole may then be used to power the electric downhole tools connected to the generator.

SUMMARY

In some embodiments, a downhole power generation system includes a housing, a rotor in the housing, and a stator. A primary fluid path is located between the rotor and the housing. A secondary fluid path having a secondary inlet is located between the rotor and the stator. A magnet is located proximate the secondary inlet.

In some embodiments, a downhole motor includes a primary fluid path located between a housing and a rotor. A fluid passing through the primary fluid path being configured to rotate the rotor. A secondary fluid path is directed from the primary fluid path at a secondary inlet. The secondary fluid path is located between the rotor and the stator. A magnet is located downstream the secondary inlet.

In some embodiments, a method for generating power includes flowing a fluid flow through a primary fluid path to rotate a rotor. The primary fluid path is located between a housing and the rotor. A portion of the fluid flow is diverted into a secondary inlet and through a secondary fluid path to lubricate the rotor. The secondary fluid path is located between the rotor and a stator. Magnetic particles are biased in the fluid flow away from the secondary inlet with a magnet.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of this disclosure generally relate to devices, systems, and methods for downhole power generation and/or operation of a downhole tool such as a motor. A downhole generator can include a motor with a rotor and a stator. The rotor rotates relative to the stator, and magnets in the rotor may generate an electric current in coils in the stator. Drilling fluid may flow through a primary fluid path between a housing and the rotor, thereby rotating the rotor and generating power. Drilling fluid may be directed through a secondary inlet to secondary fluid path between the rotor and the stator. The drilling fluid in the secondary fluid path may lubricate the motor, power generator, or other downhole tool, and specifically the rotor as it rotates around or relative to the stator, which can also or alternatively act to cool the downhole motor or generator. A magnet may be located proximate the secondary inlet. The magnet may redirect magnetic particles in the lubricating fluid away from the secondary inlet, or otherwise restrict them from entering the secondary inlet. This may help to prevent the magnetic particles from collecting on magnets on the rotor and clogging the secondary fluid path.

Figure 1:
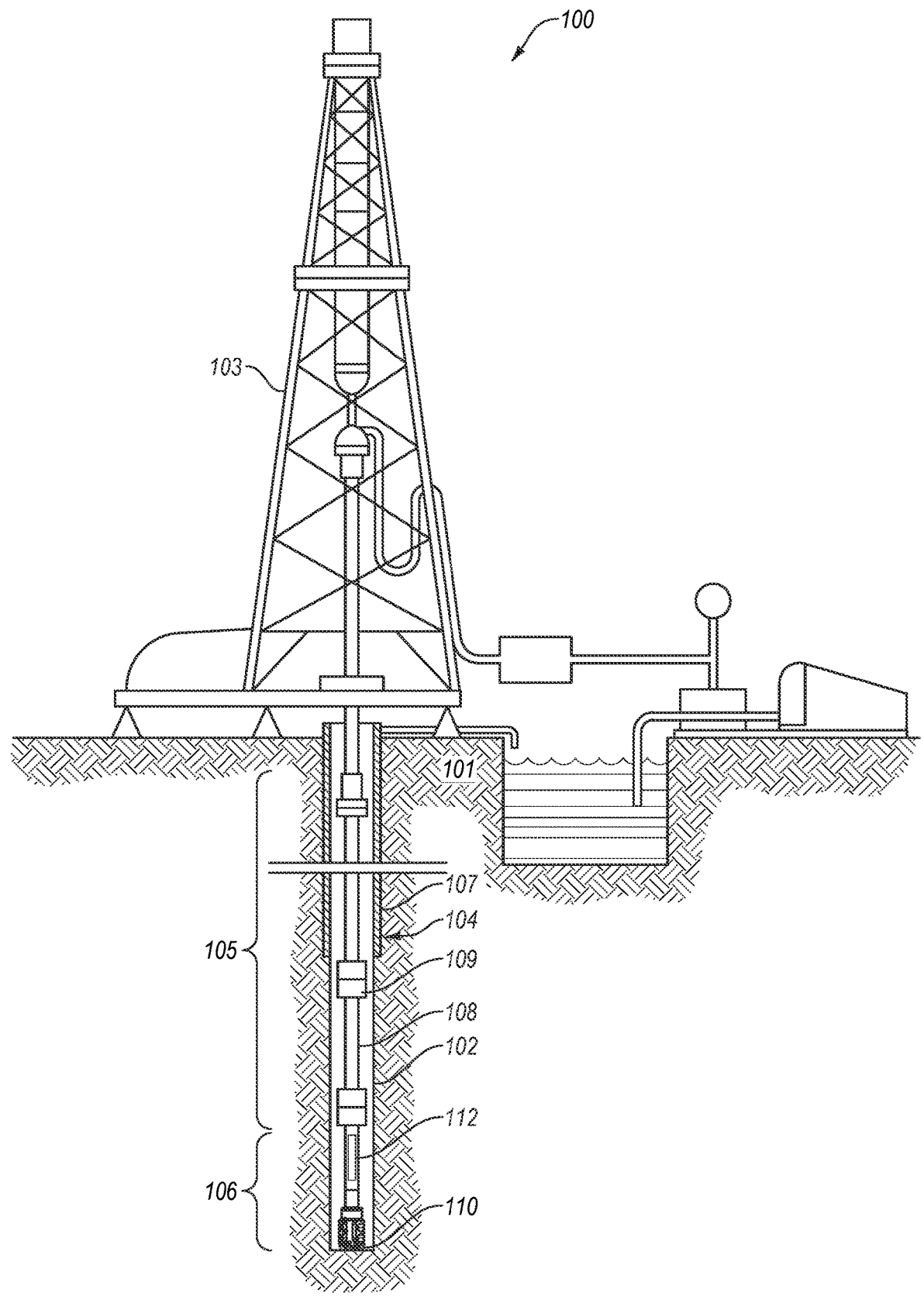
FIG. 1 is a schematic view of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly (BHA) 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

The BHA may include one or more systems that utilize electric power, including the MWD, LWD, RSS, various sensors, actuators, valves, pistons, and so forth. Electric power may be generated downhole with a downhole motor 112. The downhole motor 112 may be powered by drilling fluid passing through the drill string 105. In one example, the drilling fluid may impact one or more fins on a rotor of the downhole motor 112, thereby rotating the rotor with respect to a stator. The rotation of the rotor may generate power for the downhole electric systems.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole.

During operation, the drilling fluid may accumulate magnetic particles. The source of these magnetic particles may be from any magnetic metal in the drilling system 100. For example, as the drill string 105 rotates, the material drill pipes 108 may wear from contact with the wellbore wall, erosion from the drilling fluid, actuation of various tools, any other wearing mechanism, and combinations. Other sources of magnetic material may include milling of casings or downhole tools, wear from the bit, breaking of downhole tools, any other source, and combinations thereof.

As the magnetic particles passes through the drill string 105 and the BHA 106, the magnetic particles may be attracted to one or more magnets in the downhole tools of the drill string 106 and the BHA 106. For example, the rotor of the downhole motor 112 may include one or more permanent magnets. As drilling fluid passes between the rotor and the stator of the downhole motor 112, the permanent magnets may attract the magnetic particles in the drilling fluid. Some of those magnetic particles may stick to the permanent magnets or otherwise be captured in the magnetic field created by the permanent magnets. Over time, a mass of the magnetic particles may collect on or near the magnets. The magnetic particles on or near the magnet may reduce the magnetic field of the magnet, thereby reducing the effectiveness of the motor. In some situations, the magnetic particles may at least partially clog or obstruct the secondary fluid path, which may cause the rotor to get stuck with respect to the stator. The drilling fluid flow along the secondary fluid path may lubricate the downhole motor, and reducing the flow as a result of an obstruction may additionally or alternatively cause the motor to overheat.

In accordance with at least one embodiment of the present disclosure, one or more magnets may be placed proximate an inlet of the secondary fluid path. The magnets may attract the magnetic particles to limit their flow into the inlet. In some embodiments, the magnets may prevent at least some of the magnetic particles from entering the secondary fluid path at the inlet. Reducing the number of magnetic particles from entering the secondary fluid path may help to reduce the quantity of magnetic particles that are collected on the magnets of the rotor. This may reduce the chance for the rotor to clog or bind at the secondary fluid path or reduce obstructions of flow through or around the rotor or stator. This may help to improve the reliability of the downhole motor 112.

Figure 2:
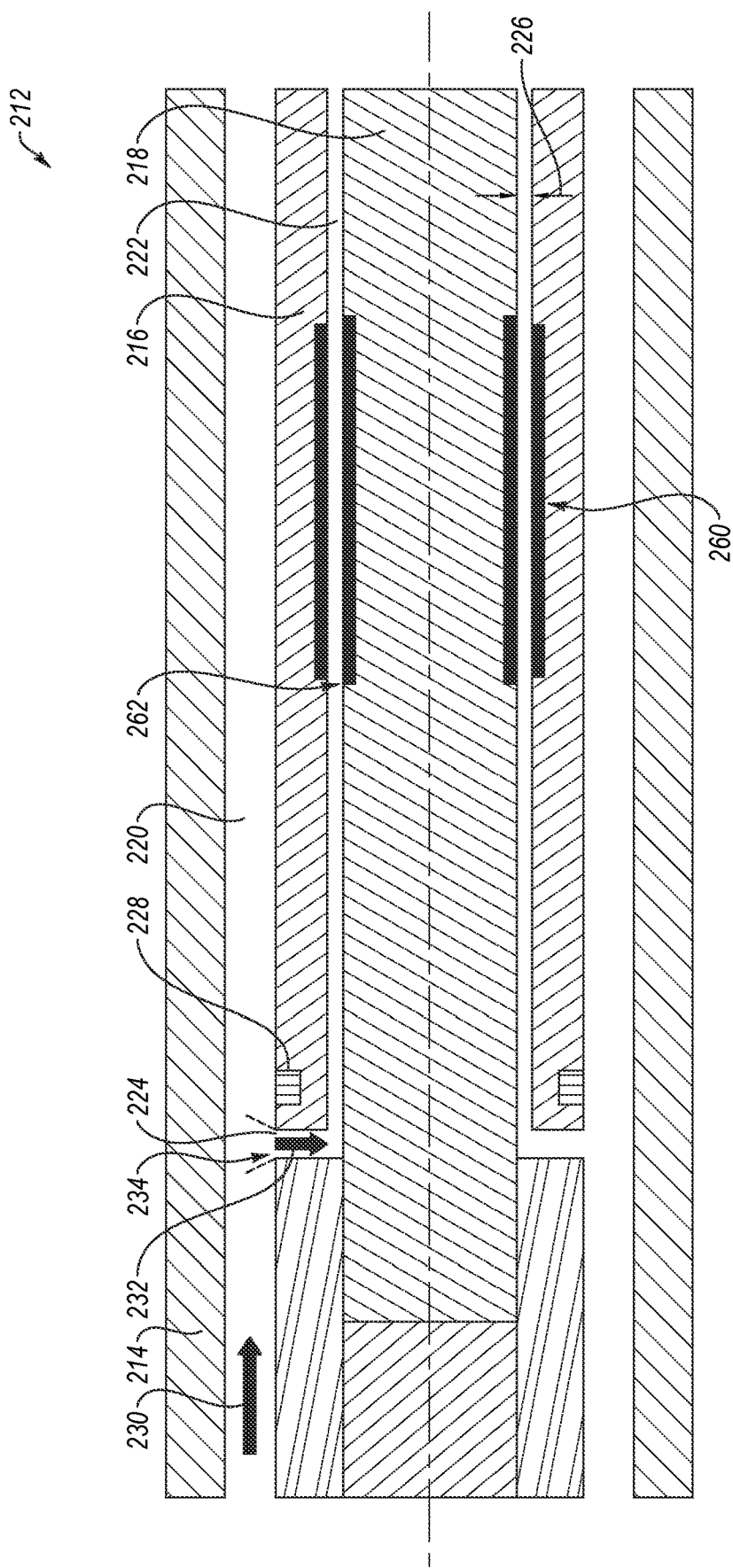
FIG. 2 is a cross-sectional view of a downhole motor including a magnet, according to at least one embodiment of the present disclosure.

FIG. 2 is a representation of a downhole motor 212, according to at least one embodiment of the present disclosure. The downhole motor 212 includes a housing 214. In this embodiment, a rotor 216 is located inside the housing 214 and is configured to rotate around a stator 218. A primary fluid path 220 is located in an annulus between the rotor 216 and the housing 214, and drilling fluid flowing through the housing 214 may pass through the primary fluid path 220 and engage with one or more fins (see fins 1058 of FIG. 10) on the rotor 216. The engagement of the drilling fluid with the fins may cause the rotor 216 to rotate around the stator 218. The rotor 216 may include one or more magnets 260 and the stator 218 may include one or more coils 262, and the rotation of the magnets 260 with respect to the coils 262 may generate power.

The downhole motor 212 includes a secondary fluid path 222 between the rotor 216 and the stator 218, and radially inward relative to the primary fluid path 220. Drilling fluid may be directed into the secondary fluid path 222 from the primary fluid path 220 at a secondary inlet 224. The drilling fluid flowing through the secondary fluid path 222 may help to lubricate and/or cool the rotor 216 and the stator 218.

The secondary fluid path 222 may have a mud gap 226, which is a difference in the outer diameter of the stator 218 and the inner diameter of the rotor 216. In some embodiments, the mud gap 226 may be in a range having a lower value, an upper value or lower and upper values including any of 0.5 mm, 0.6 mm, 0.7 mm, 0.8 mm, 0.9 mm, 1.0 mm, 1.1 mm, 1.2 mm, 1.3 mm, 1.4 mm, 1.5 mm, 2.0 mm, 5 mm, or any value therebetween. For example, the mud gap 226 may be greater than 0.5 mm. In another example, the mud gap 226 may be less than 5.0 mm or less than 1.5 mm. In yet other examples, the mud gap 226 may be any value in a range between 0.5 mm and 5.0 mm, including between 0.5 mm and 1.5 mm. In some embodiments, it may be critical that the mud gap 226 is non-zero and less than 1.1 mm to increase the efficiency of the downhole motor 212.

As discussed herein, the drilling fluid may include magnetic particles. In some embodiments, the magnetic particles in the secondary fluid path may be attracted to the permanent magnets 260 on the rotor 216. The magnetic particles may stick to the magnets 260 within the secondary fluid path 222, reducing its cross-sectional area. In some situations, the magnetic particles may extend across the entirety of the mud gap 226. Any collection of magnetic particles may reduce the amount of drilling fluid passing through the secondary fluid path 222, thereby reducing the effectiveness of the drilling fluid to lubricate or cool the rotor 216 and stator 218.

Conventionally, magnetic particles stuck to the stator may be mechanically scraped away by protrusions or ridges on the rotor 216 and/or the stator 218. However, such ridges may increase the mud gap 226 along portions of the motor, thereby reducing the efficiency of the motor.

In accordance with at least one embodiment of the present disclosure, the downhole motor 212 may include a magnet 228. The magnet 228 may be located proximate the secondary inlet 224 and attract magnetic particles in the drilling fluid away from the secondary inlet 224. In some embodiments, the magnet 228 may be located within an influence zone of the secondary inlet 224. For example, proximate the secondary inlet 224 may be interpreted to mean that the secondary inlet 224 is within the magnetic field of the magnet 228. Proximate the secondary inlet 224 may be interpreted to mean that an inlet zone 234 or a portion of the inlet zone 234 is within the magnetic field of the magnet 228. In some examples, proximate the secondary inlet 224 may be interpreted to mean that the secondary inlet 224 and/or the inlet zone 234 is fully or partially within the magnetic field of the magnet 228 when the magnet is covered with a protrusion, dendrite, or other accumulation of magnetic particles on the magnet 228. Notably, where the magnet 228 is proximate the secondary inlet 224 or inlet zone 234, the strength of the magnet may thus determine the absolute distance as a stronger magnet may have a larger magnetic field than a relatively weaker magnet.

In some embodiments, the magnet 228 may attract the magnetic particles and thus bias the magnetic particles away from the secondary inlet 224. This may restrict or even prevent at least some of the magnetic particles from entering the secondary fluid path 222 at the secondary inlet 224. Preventing at least some of the magnetic particles from entering the secondary fluid path 222 may help to reduce the number of magnetic particles in the secondary inlet 224. This may help to reduce the number of magnetic particles that stick to the permanent magnets on the rotor 216. This may help to improve the efficiency and reliability of the downhole motor 212.

A fluid flow 230 may flow through the primary fluid path 220. As the fluid flow 230 passes past the secondary inlet 224, a portion 232 of the fluid flow 230 may be diverted into the secondary fluid path 222. The portion 232 of the fluid flow 230 may be diverted based on a difference in pressure between the primary fluid path 220 and the secondary fluid path 222. The movement of the portion 232 of the fluid flow 230 may begin or originate within the primary fluid path 220 with an inlet zone 234 that extends into the primary fluid path 220. In some embodiments, the magnet 228 may attract the magnetic particles that are in the inlet zone 234. This may help to prevent the magnetic particles within the inlet zone 234 from entering the secondary fluid path 222.

In some embodiments, the magnet 228 may bias the magnetic particles away from the secondary inlet 224 until the magnetic particles leave the inlet zone 234. For example, the fluid flow 230 may have a momentum. The attraction of the magnet 228 may add to the momentum of the fluid flow for the magnetic particles. This may cause the magnetic particles to be diverted out of the inlet zone 234.

In some embodiments, the magnetic particles may be diverted out of the inlet zone 234 and the momentum of the primary fluid flow 230 may cause the magnetic particles to continue along the primary fluid path 220 and out of the area of influence of the magnet 228. In some embodiments, the magnetic particles may be attracted to the magnet 228 and may stick to the magnet 228. In some embodiments, the magnetic particles may accumulate (e.g., forming protrusions, dendrites, or another mass of magnetic particles) on the magnet 228. As the particle accumulation grows or extends into the primary fluid path 220, the primary fluid flow 230 may strip the magnetic particles from the accumulation. The accumulation may weaken the attractive force of the magnet 228. In some embodiments, the stripping of the magnetic particles from the accumulation may reach an equilibrium with the attractive force of the magnet 228. The magnet 228 may be sized/selected based on the equilibrium and the attractive force to continue to bias the magnetic particles away from the inlet zone 234 while accumulating an equilibrium accumulation of magnetic particles.

In the embodiment shown, the magnet 228 is located downstream of the secondary inlet 224 based on the primary fluid flow 230, such that the secondary inlet 224 is located upstream of the magnet 228. As discussed herein, the primary fluid flow 230 has a momentum. By locating the magnet 228 downstream of the secondary inlet 224 in the primary fluid flow 230, the attractive force of the magnet 228 on the magnetic particles may bias the magnetic particles in the direction of the primary fluid flow 230. This may cause the magnetic particles to pass beyond the secondary inlet 224, thereby preventing the magnetic particles from entering the secondary fluid path 222. Consequently, even if the magnetic field weakens or the primary fluid flow 230 strips particles from the accumulation on the magnet 228, the particles will remain in the primary fluid flow 230 rather than being split into the secondary fluid path 222.

In the embodiment shown, the magnet 228 is located on the rotor 216. The magnet 228 may be connected to the rotor 216 using any mechanism. For example, the magnet 228 may be connected to the rotor 216 using a press-fit, a shrink fit, a mechanical fastener, an adhesive, a braze, a weld, any other connection mechanism, and combinations thereof.

In some embodiments, the magnet 228 may include a plurality of magnets. Each magnet 228 may be located on the rotor 216, or the plurality of magnets may be in multiple locations (e.g., including locations discussed relative to FIGS. 3 to 10). The magnets 228 on the rotor 216 may rotate with the rotor 216. In some embodiments, a plurality of magnets 228 may be positioned circumferentially around the rotor 216. In some embodiments, a plurality of magnets 228 may be positioned circumferentially around the rotor 216 at the same longitudinal/axial distance from the secondary inlet 224 or the upper/proximal end of the motor 212. Locating the magnets 228 circumferentially around the rotor 216 may allow the magnets 228 to attract the magnetic particles around a full or partial circumference of the annulus that forms the primary fluid path 220.

In some embodiments, the magnet 228 is a permanent magnet. The magnet 228 may be any type of permanent magnet, including rare-earth magnets, alnico, ferrite, any other permanent magnet, and combinations thereof. A permanent magnet may indefinitely retain its magnetic qualities. In this manner, the magnet 228 may always be diverting the magnetic particles away from the secondary inlet 224.

In some embodiments, the permanent magnet 228 may be an electromagnet. The electromagnet may generate a magnetic field based on an applied electric current. The magnetic field generated by the electromagnet may be controlled based on the strength of the applied electric current. In this manner, the magnetic attraction may be selectively turned on, turned off, increased, or decreased, based on various operating factors. For example, the strength of the magnetic field may be increased based on an increase in magnetic particles. In some examples, the magnetic field may be shut off to clear any accumulated magnetic particles off the magnet 228. In some embodiments, the electromagnet is powered by the primary fluid flow 230 within the motor 212.

Figure 3:
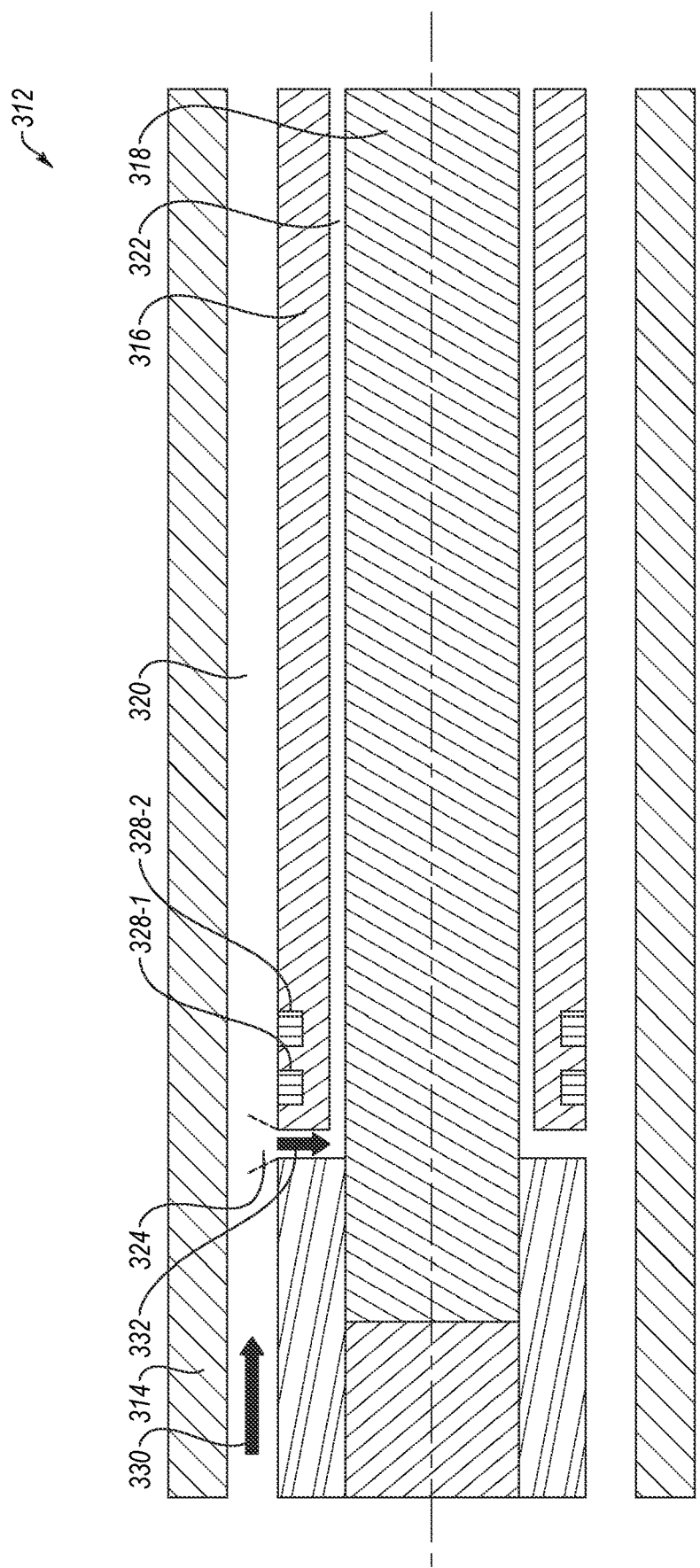
FIG. 3 is a cross-sectional view of a downhole motor including a magnet, according to at least one embodiment of the present disclosure.

FIG. 3 is a representation of a downhole motor 312, according to at least one embodiment of the present disclosure. The downhole motor 312 includes a housing 314 with a rotor 316 and a stator 318 located in the housing 314. The rotor 316 may be configured to rotate around the stator 318. A fluid flow 330 flows through a primary fluid path 320 and may engage the rotor 316 to rotate the rotor 316 relative to the stator 318. In some embodiments, a portion 332 of the fluid flow may be diverted into a secondary fluid path at a secondary inlet 324.

The downhole motor 312 may include a plurality of magnets 328-1, 328-2 (collectively 328) proximate the secondary inlet 324. The magnets 328 may be connected to the rotor 316 downstream of the secondary inlet 324. In some embodiments, a first set of magnets 328-1 may be located proximate the secondary inlet 324. In some embodiments, a second set of magnets 328-2 may be located proximate the secondary inlet 324.

In some embodiments, the second set of magnets 328-2 may help to further bias the magnetic particles in the first fluid flow 330 away from the secondary inlet 324. For example, the first set of magnets 328-1 may apply a first magnetic field that extends upstream of the secondary inlet 324. The second set of magnets 328-2, in combination with the first set of magnets 328-1, may apply an increased magnetic field at the secondary inlet. In this manner, the first set of magnets 328-1 may provide an initial biasing force on the magnetic particles, which may be reinforced by the second set of magnets 328-1 as the magnetic particles pass the secondary inlet, thereby restricting and even preventing more of the magnetic particles from entering the secondary fluid path 322 at the secondary inlet 324.

In some embodiments, the second set of magnets 328-2 may be back-up magnets. For example, during operation of the rotor 316, one or more of the magnets 328 may become dislodged, worn down, or otherwise rendered ineffective. In some embodiments, having two sets of magnets 328 may help to increase the operational lifetime of the downhole motor 312.

In some embodiments, the magnets 328 may be electromagnets. To clean accumulated material off the magnets 328, the electromagnets may be shut off. To maintain magnetic coverage over the secondary inlet 324, the first set of magnets 328-1 may be shut down at different times than the second set of magnets 328-2.

Figure 4:
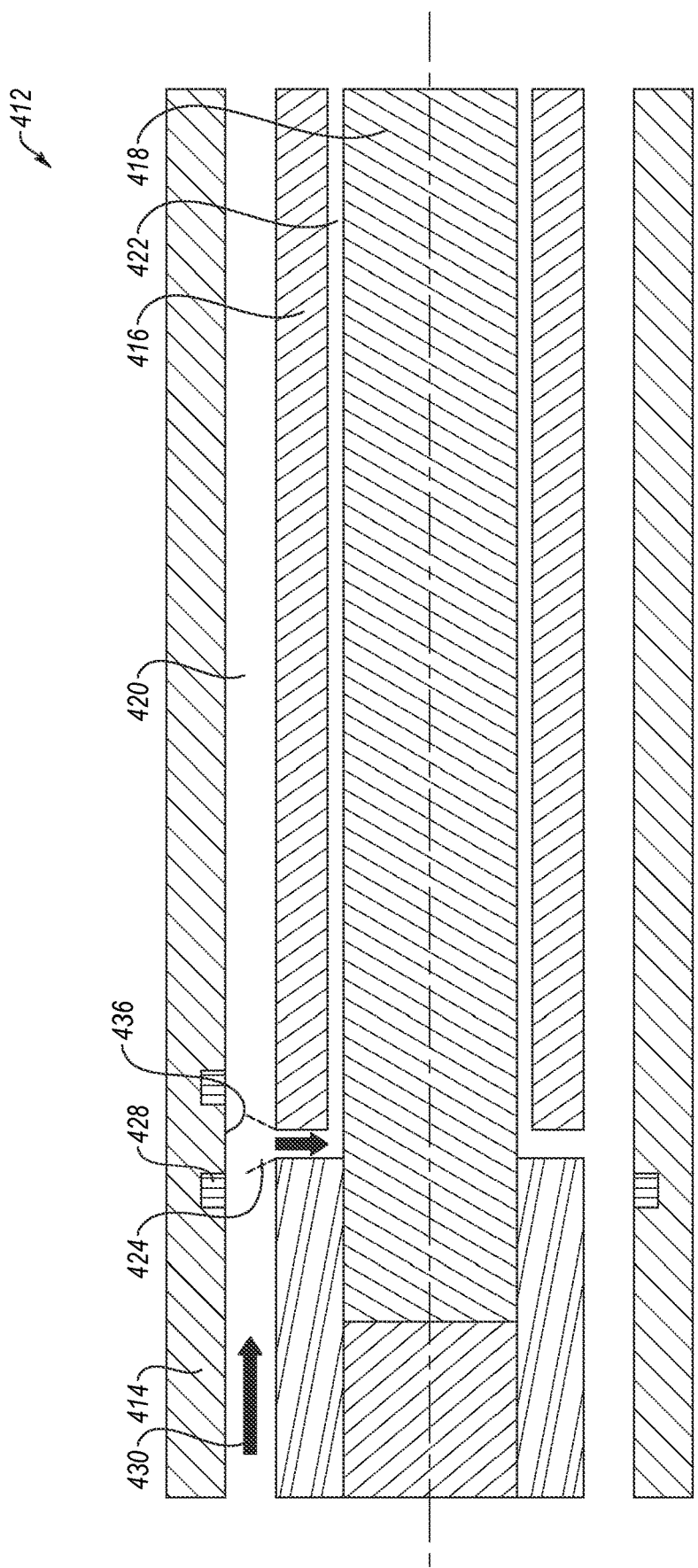
FIG. 4 is a cross-sectional view of a downhole motor including a magnet, according to at least one embodiment of the present disclosure.

FIG. 4 is a representation of a downhole motor 412 having a magnet 428 in a housing, according to at least one embodiment of the present disclosure. The downhole motor 412 includes a housing 414. A rotor 416 is located inside the housing 414. The rotor 416 is configured to rotate around a stator 418. A primary fluid path 420 is located in an annulus between the rotor 416 and the housing 414. Drilling fluid flowing through the housing 414 may pass through the primary fluid path 420 and engage with one or more fins on the rotor. The engagement of the drilling fluid with the fins may cause the rotor 416 to rotate around the stator 418. The rotor 416 may include one or more magnets and the stator 418 may include one or more coils, and the rotation of the magnets with respect to the coils may generate power.

In the embodiment shown, the magnet 428 is located in the housing 414. In some embodiments, the magnet 428 in the housing 414 may bias magnetic particles in the fluid flow 430 toward an inner surface 436 of the housing 414. This may help to prevent at least some of the magnetic particles from entering the secondary fluid path 422 at the secondary inlet 424.

In some embodiments, the magnet 428 may be located upstream of the secondary inlet 424 in the fluid flow 430. This may help to bias the magnetic particles away from the secondary inlet 424 before the magnetic particles reach the secondary inlet. In some embodiments, the magnet 428 may be located in the housing 414 at the secondary inlet 424. In some embodiments, the magnet 428 may be located in the housing 414 downstream of the secondary inlet 424. In some embodiments, the downhole motor 412 may include a plurality of magnets 428, and the plurality of magnets may be located at multiple longitudinal locations along the housing, including one or more of before the secondary inlet 424, at the secondary inlet 424, or downstream of the secondary inlet 424. The plurality of magnets 428 are therefore illustrative as magnets are optionally positioned only upstream of the secondary inlet 424, only downstream of the secondary inlet 424, only in axial alignment with the secondary inlet 424, or at any combination of upstream, downstream, or axial alignment relative to the secondary inlet 424.

In some embodiments, the magnet 428 may be embedded in the housing such that an outer surface of the magnet 428 is flush or recessed relative to the inner surface 436 of the housing 414. This may help to restrict or prevent the magnet 428 from obstructing the fluid flow 430. In some embodiments, as may be seen in FIG. 5, a magnet 528 may extend away from an inner surface 536 of a housing 514 of a downhole motor 512. At least a portion of the magnet 528 may extend into the primary fluid path 520 such that the fluid flow 530 may flow around the magnet 528. Having at least a portion of the magnet 528 extend into the primary fluid path 520 may allow the magnetic field of the magnet 528 to extend closer to, or even into, the secondary inlet 524. This may further help to bias the magnetic particles in the fluid flow 530 away from the secondary inlet 524, thereby preventing more of the magnetic particles from entering the secondary fluid path 522.

Figure 5:
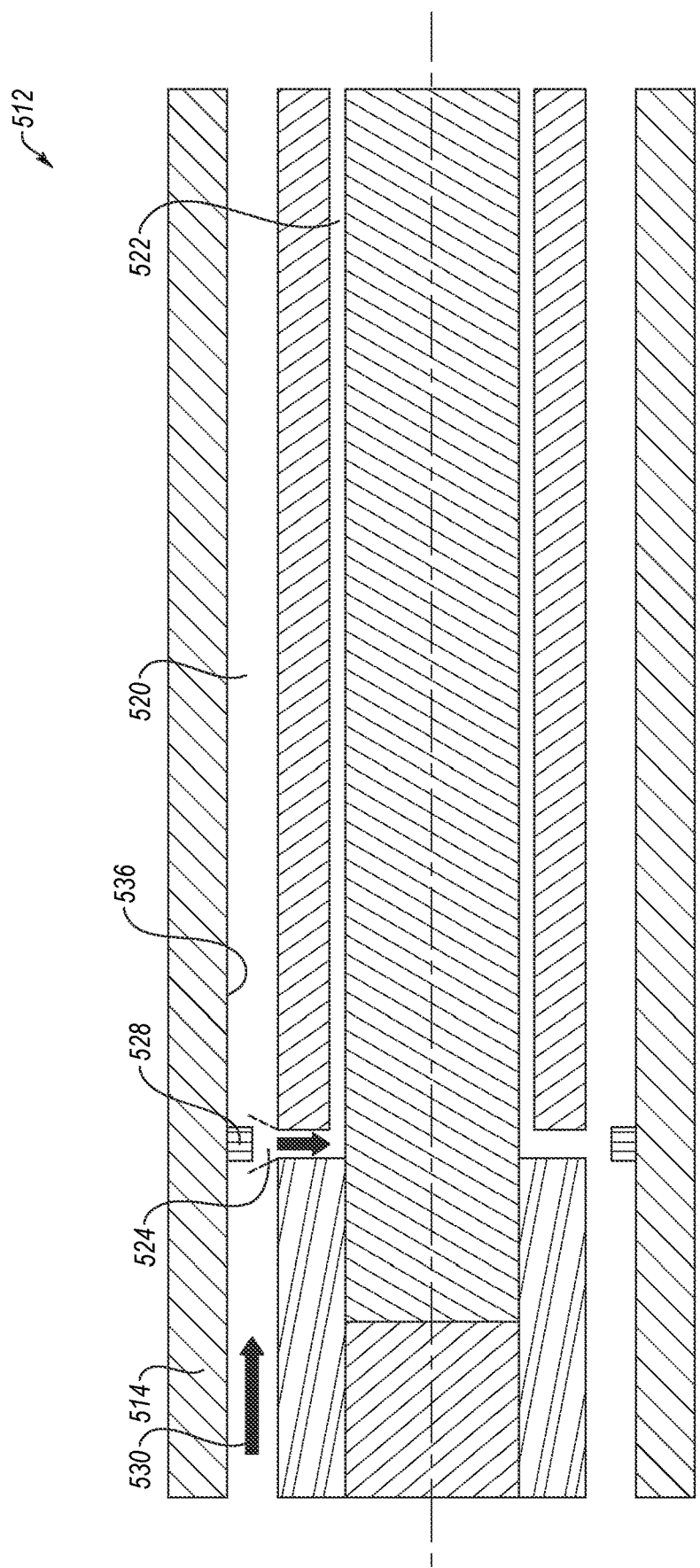
FIG. 5 is a cross-sectional view of a downhole motor including a magnet, according to at least one embodiment of the present disclosure.

In the embodiment shown in FIG. 5, the magnet 528 is located in axial alignment with the secondary inlet 524. However, as discussed herein, the magnet 528 may be located at any location proximate the secondary inlet 524, including upstream or downstream of the secondary inlet 524. Further, while FIG. 5 shows a magnet 528 on the housing 514 and extending into the primary fluid flow path 520, it will be appreciated in view of the disclosure herein that a magnet in other locations (e.g., on the rotor as shown in FIGS. 2 and 3) may not be flush with or recessed into another component, and may instead extend into the primary fluid flow path.

Figure 6:
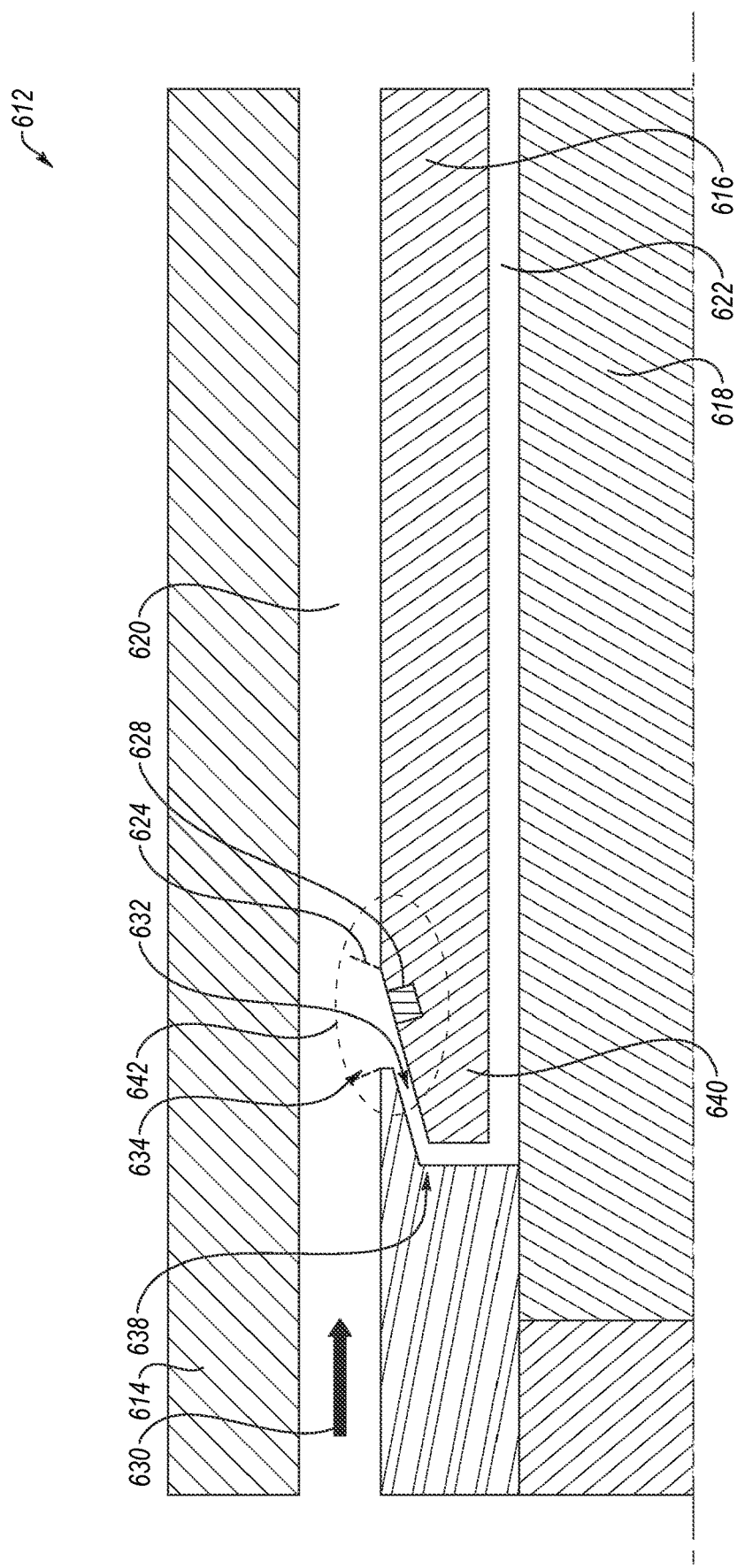
FIG. 6 is a cross-sectional view of a downhole motor including a magnet, according to at least one embodiment of the present disclosure.

FIG. 6 is a cross-sectional view of downhole motor 612 including a secondary inlet 624 of a downhole motor 612, according to at least one embodiment of the present disclosure. The downhole motor 612 includes a rotor 616 and a stator 618. A fluid flow 630 of drilling fluid passes through a primary fluid path 620 and engages one or more fins on the rotor 616 to rotate the rotor 616. Rotation of the rotor 616 about the stator 618 to generate power is lubricated by a portion 632 of the fluid flow 630 of drilling fluid that is directed away from the primary fluid path 620 into a secondary fluid path 622. The redirected portion 632 of the drilling fluid enters the secondary fluid path 622 at a secondary inlet 624.

In the embodiment shown, after the portion 632 of the drilling fluid enters the secondary inlet 624, it is routed into an uphole portion 638 of the secondary fluid path 622. In the uphole portion 638, the energy and pressure drop of the portion 632 of the drilling fluid is controlled to maintain an operating pressure and flow rate of the portion 632 of the drilling fluid in the secondary fluid path 622. As may be seen, the uphole portion 638 may be formed using a sloped head 640 of the rotor 616. The slope of the head 640 may result in a large inlet zone 634. Drilling fluid in the inlet zone 634 may experience turbulent flow, based on the redirection of the portion 632 of the drilling fluid. In the illustrated embodiment, the sloped head 640 may redirect fluid from the primary fluid flow 630 that is generally in a downhole/downstream direction, to a secondary fluid path 622 that is radially inward and axially upward/upstream, before transitioning to a downhole/downstream direction. In other embodiments, the fluid may be directed in a primarily radial direction (see FIGS. 2-5) before transitioning to an axial flow, although a sloped head 640 may also direct flow radially inward and axially downhole/downstream in other embodiments.

In accordance with at least one embodiment of the present disclosure, a magnet 628 may be located on the rotor 616. The magnet 628 may be located on the head 640 of the rotor 616. In some embodiments, the magnet 628 may be located in the inlet zone 634. The magnet 628 may bias magnetic particles in the fluid flow 630 away from the secondary inlet 624. In some embodiments, the magnet 628 may attract and bias the magnetic particles away from the secondary inlet 624 just enough that their momentum may carry them out of the inlet zone 634, thereby restricting or even preventing them from entering the secondary fluid path 622.

The magnet 628 has a zone of influence 642. The zone of influence 642 may include the magnetic field of the magnet 628. In some embodiments, the zone of influence 642 of the magnet 628 may be the area in which the magnetic field may apply a magnetic force to magnetic particles in the fluid flow 630, biasing them toward the magnet 628. In some embodiments, the zone of influence 642 may have any desirable size or position. For example, in the embodiment shown, the zone of influence 642 is located in the inlet zone 634, extends to the secondary inlet 624, and partially into the uphole portion 638 of the secondary fluid path 622. In some embodiments, the zone of influence 642 may extend upstream past the upstream edge of the inlet zone 634. This may help to increase the momentum of the magnetic particles before they enter the inlet zone 634, thereby reducing effect of the turbulence in the inlet zone 634 on their path. In some embodiments, the zone of influence 642 may extend radially across an entirety of the annular space between the rotor 616 and the housing 614. In accordance with at least one embodiment of the present disclosure, the zone of influence may be determined based on the strength of the magnet 628 and/or the orientation of the magnet 628. In some embodiments, the zone of influence may change (e.g., as particles collect on the magnet 628), or the zone of influence may be defined based on a strength of the magnet 628 assuming no particle collection.

In some embodiments, the zone of influence 642 may extend into a chamber in the secondary fluid path 622 opposite the magnet 628. The chamber may fill with fluid, and the magnetic field may attract any magnetic particles into the chamber that were not redirected away from the secondary inlet 624.

While in the embodiment shown in FIG. 6 the magnet 628 is located on the sloped portion of the head 640 of the rotor 616, the magnet 628 may be located at any location described herein. For example, the magnet 628 may be located further downstream on the main body of the rotor 616, on the housing 614, or at any other suitable location. In some embodiments, the zone of influence 642 of the magnet 628 may be sized and/or determined based on the strength of the magnet, the fluid flow characteristics, and the geometry of the secondary inlet and/or the secondary fluid path 622.

Figure 7:
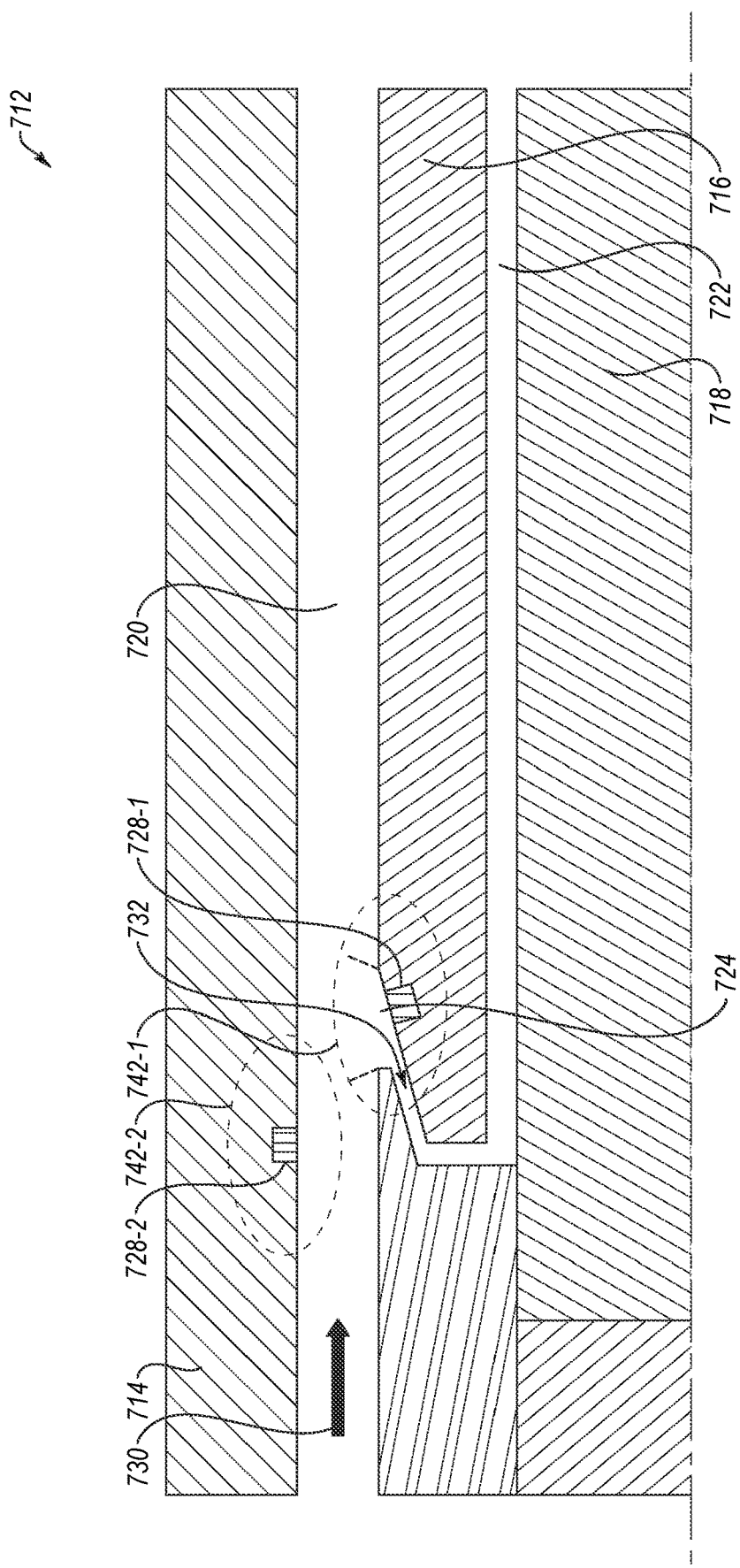
FIG. 7 is a cross-sectional view of a downhole motor including a magnet, according to at least one embodiment of the present disclosure.

FIG. 7 is a cross-sectional view of a secondary inlet 724 of a downhole motor 712, according to at least one embodiment of the present disclosure. The downhole motor 712 includes a rotor 716 and a stator 718. A fluid flow 730 of drilling fluid passes through a primary fluid path 720 and engages one or more fins on the rotor 716 to rotate the rotor 716. Rotation of the rotor 716 about the stator 718 to generate power is lubricated by a portion 732 of the fluid flow 730 of drilling fluid that is directed away from the primary fluid path 720 into a secondary fluid path 722. The redirected portion 732 of the drilling fluid enters the secondary fluid path 722 at a secondary inlet 724.

In the embodiment shown, the downhole motor 712 includes two magnets 728-1, 728-2 (collectively 728). A first magnet 728-1 is located on the rotor 716 and a second magnet 728-2 is located on the housing 714. The first magnet 728-1 has a first zone of influence 742-1 and the second magnet 728-2 has a second zone of influence 742-2. The magnetic field of each of the magnets 728 may attract and bias magnetic particles away from the secondary inlet 724. For example, the first magnet 728-1 may be located downstream of the secondary inlet 724 and may bias magnetic particles downstream of the secondary inlet 724. The second magnet 728-2 may be located upstream of the secondary inlet 724, be axially aligned with the secondary inlet 724, or even downstream of the secondary inlet 724, and may bias magnetic particles toward the housing 714. The two magnets 728 may work together to bias magnetic particles away from the secondary inlet 724, thereby reducing the number of magnetic particles that enter the secondary fluid path 722.

In some embodiments, the first zone of influence 742-1 and the second zone of influence 742-2 may not overlap. This may help to prevent the magnetic fields of the two zones from interacting and causing unpredictable movement of the magnetic particles. In some embodiments, the first zone of influence 742-1 and the second zone of influence 742-2 may overlap. This may help to direct the magnetic particles through a particular portion of the primary fluid path 720.

Figure 8:
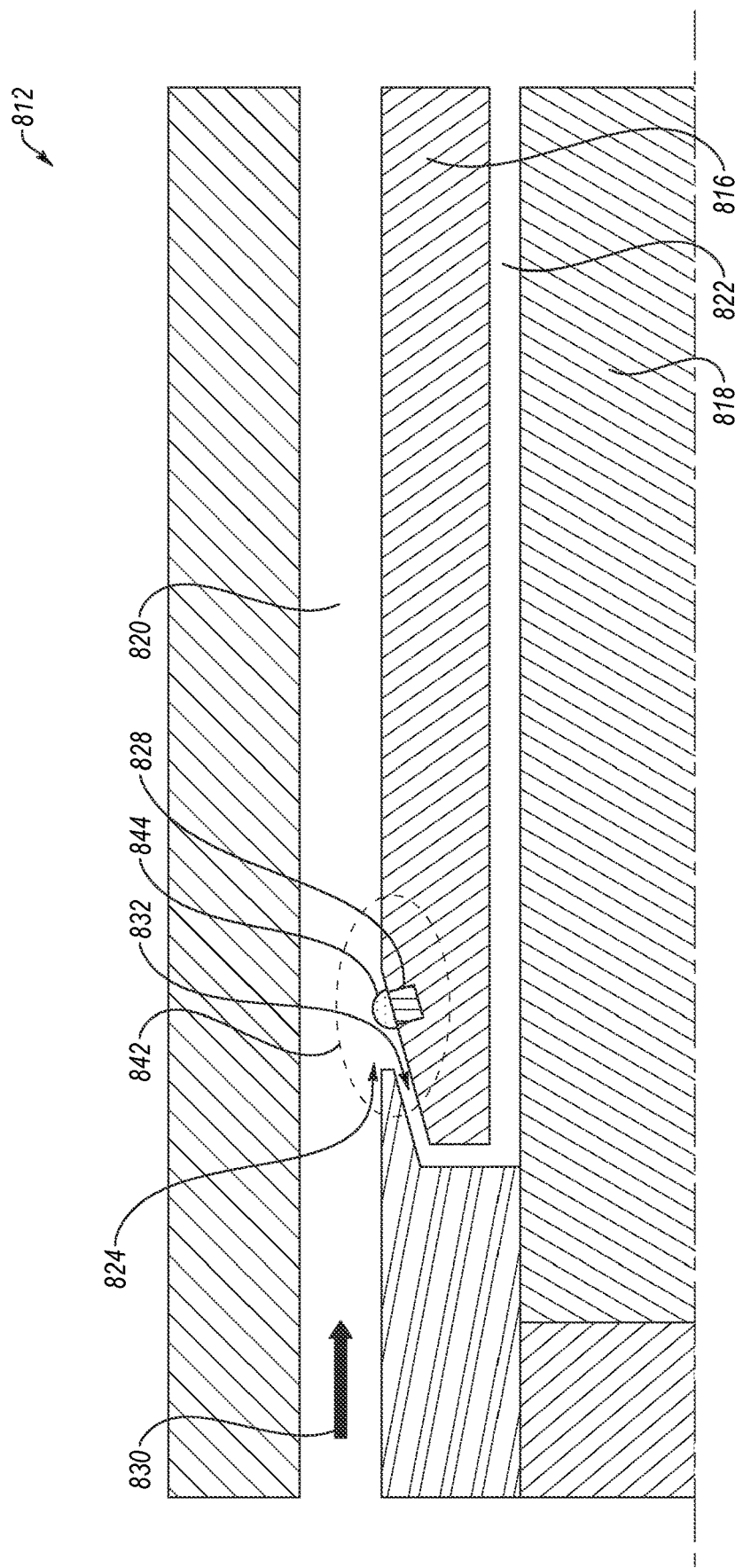
FIG. 8 is a cross-sectional view of a downhole motor including a magnet, according to at least one embodiment of the present disclosure.

FIG. 8 is a cross-sectional view of a secondary inlet 824 of a downhole motor 812, according to at least one embodiment of the present disclosure. The downhole motor 812 includes a rotor 816 and a stator 818. A fluid flow 830 of drilling fluid passes through a primary fluid path 820 and engages one or more fins on the rotor 816 to rotate the rotor 816. Rotation of the rotor 816 about the stator 818 to generate power is lubricated by a portion 832 of the fluid flow 830 of drilling fluid that is directed away from the primary fluid path 820 into a secondary fluid path 822. The redirected portion 832 of the drilling fluid enters the secondary fluid path 822 at a secondary inlet 824.

A magnet 828 is located on the rotor 816 of the downhole motor 812. The magnet 828 may have a zone of influence 842 in which the magnetic field of the magnet 828 may bias or affect the path of magnetic particles in the fluid flow 830. In some situations, an accumulation 844 of magnetic particles may collect at the magnet 828. The accumulation 844 of magnetic particles may accumulate or collect when the strength of the magnetic field is greater than the downstream force on the magnetic particles by the fluid flow 830.

In some embodiments, the accumulation 844 of magnetic particles may adjust the zone of influence 842. As magnetic particles stick to the magnet 828, the magnetic particles may attenuate or reduce the force of the magnetic field. This may result in a decrease in the size of the zone of influence 842. In some embodiments, the accumulation 844 of the magnetic particles may extend into the primary fluid path 820. As the accumulation 844 builds and extends further into the primary fluid path 820, the force of the fluid flow 830 may halt or reduce the buildup of the magnetic particles in the accumulation 844. In some embodiments, the force of the fluid flow 830 may strip magnetic particles from the accumulation 844. In this manner, the size of the accumulation 844 may reach an equilibrium with the fluid flow 830. As the fluid flow 830 increases, the size of the accumulation 844 may decrease, and vice versa.

Figure 9:
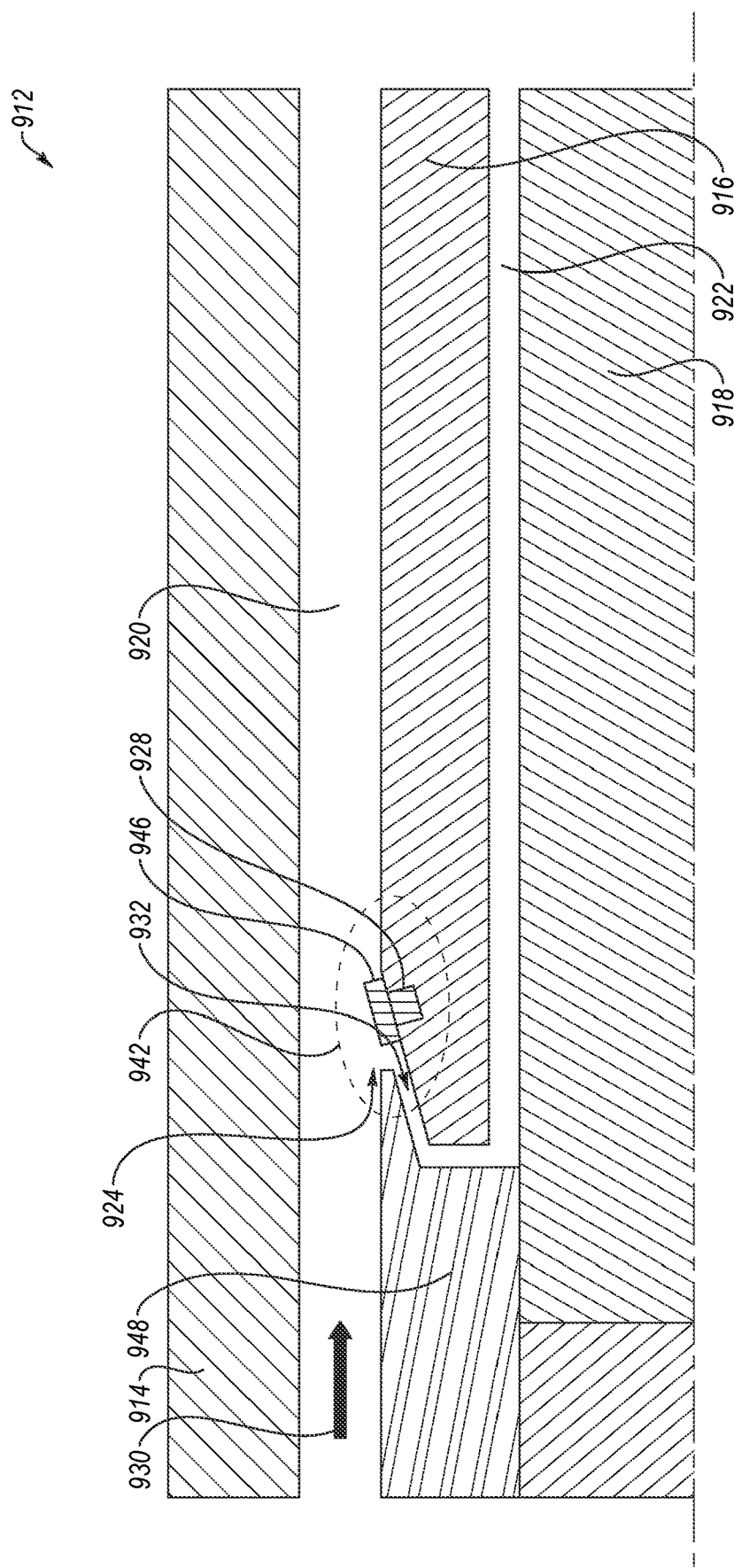
FIG. 9 is a cross-sectional view of a downhole motor including a magnet, according to at least one embodiment of the present disclosure.

FIG. 9 is a cross-sectional view of a secondary inlet 924 of a downhole motor 912, according to at least one embodiment of the present disclosure. The downhole motor 912 includes a rotor 916 and a stator 918. A fluid flow 930 of drilling fluid passes through a primary fluid path 920 and engages one or more fins on the rotor 916 to rotate the rotor 916. Rotation of the rotor 916 about the stator 918 to generate power is lubricated by a portion 932 of the fluid flow 930 of drilling fluid that is directed away from the primary fluid path 920 into a secondary fluid path 922. The redirected portion 932 of the drilling fluid enters the secondary fluid path 922 at a secondary inlet 924.

A magnet 928 is located on the rotor 916 of the downhole motor 912. The magnet 928 may have a zone of influence 942 in which the magnetic field of the magnet 928 may bias or affect the path of magnetic particles in the fluid flow 930. As discussed herein, an accumulation (e.g., accumulation 844 of FIG. 8) of magnetic particles may collect at the magnet 928. The accumulation of the magnetic particles may accumulate or collect when the strength of the magnetic field is greater than the downstream force on the magnetic particles by the fluid flow 930.

In accordance with at least one embodiment of the present disclosure, the downhole motor 912 may include a scraper 946. A scraper 946 may be configured to remove accumulated magnetic particles from the magnet 928. This may eliminate, or reduce the size of, the accumulation on the magnet 928. Eliminating or reducing the size of the accumulation on the magnet 928 may increase the zone of influence 942, thereby increasing the effectiveness of the magnet 928 at biasing magnetic particles away from the secondary inlet 924.

In some embodiments, the scraper 946 may be connected to the housing 914. For example, the scraper 946 may be suspended or otherwise supported by the housing 914 and extend down to the rotor 916. In this manner, as the rotor 916 rotates, the scraper 946 may retain its rotational position, thereby allowing the magnet 928 to move relative to the scraper 946. In some embodiments, the scraper 946 may be supported by a stator support 948.

In some embodiments, the scraper 946 may be connected to the rotor 916. The scraper 946 may be connected to one or more motors that may cause the scraper to move across the magnet 928 periodically, when the accumulation has grown past a threshold size, and/or when the zone of influence has shrunk below a threshold size. In some embodiments, the scraper 946 may be movable from the stator support 948 or other location in the downhole motor 912.

Figure 10:
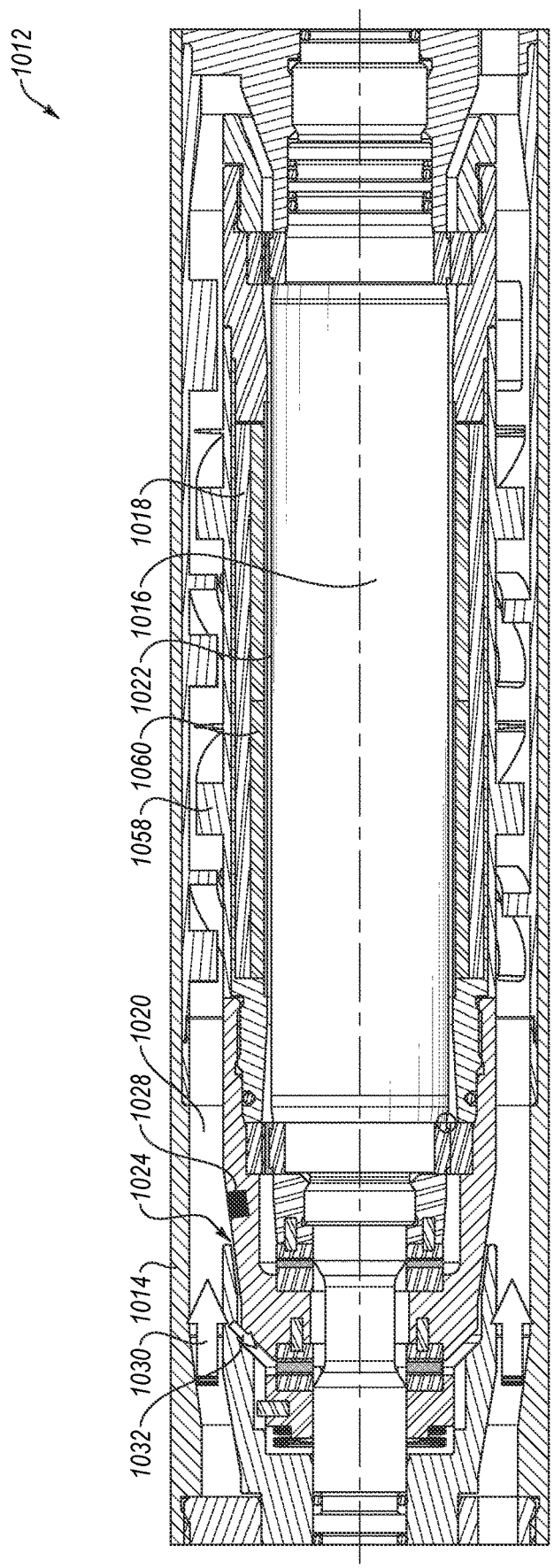
FIG. 10 is a cross-sectional view of a downhole motor including a magnet, according to at least one embodiment of the present disclosure.

FIG. 10 is a partial cross-sectional view of a downhole motor 1012 having a magnet 1028 in a rotor 1016, according to at least one embodiment of the present disclosure. The downhole motor 1012 includes a housing 1014. The rotor 1016 is located inside the housing 1014. The rotor 1016 is configured to rotate around a stator 1018. A primary fluid path 1020 is located in an annulus between the rotor 1016 and the housing 1014. Drilling fluid flowing through the housing 1014 may pass through the primary fluid path 1020 and engage with one or more fins 1058 on the rotor 1016. The engagement of the drilling fluid with the fins 1058 may cause the rotor 1016 to rotate around the stator 1018. The rotor 1016 may include one or more rotor magnets 1060 and the stator 1018 may include one or more coils, and the rotation of the magnets 1060 with respect to the coils may generate power.

As discussed herein, a fluid flow 1030 of drilling fluid may pass through the primary fluid path 1020. At a fluid inlet 1024, a portion 1032 of the fluid flow 1030 may be diverted into a secondary fluid path 1022. The portion 1032 of the fluid flow 1030 may lubricate the downhole motor 1012 and/or provide cooling for the various parts of the downhole motor 1012. As discussed herein, a magnet 1028 may be located proximate the fluid inlet 1024. The magnet 1028 may bias magnetic particles in the fluid flow 1030 away from the fluid inlet 1024, thereby preventing at least some of the magnetic particles from entering the secondary fluid path 1022. This may help to prevent the magnetic particles from being attracted to and collecting on the magnets 1060 on the rotor 1016.

Figure 11:
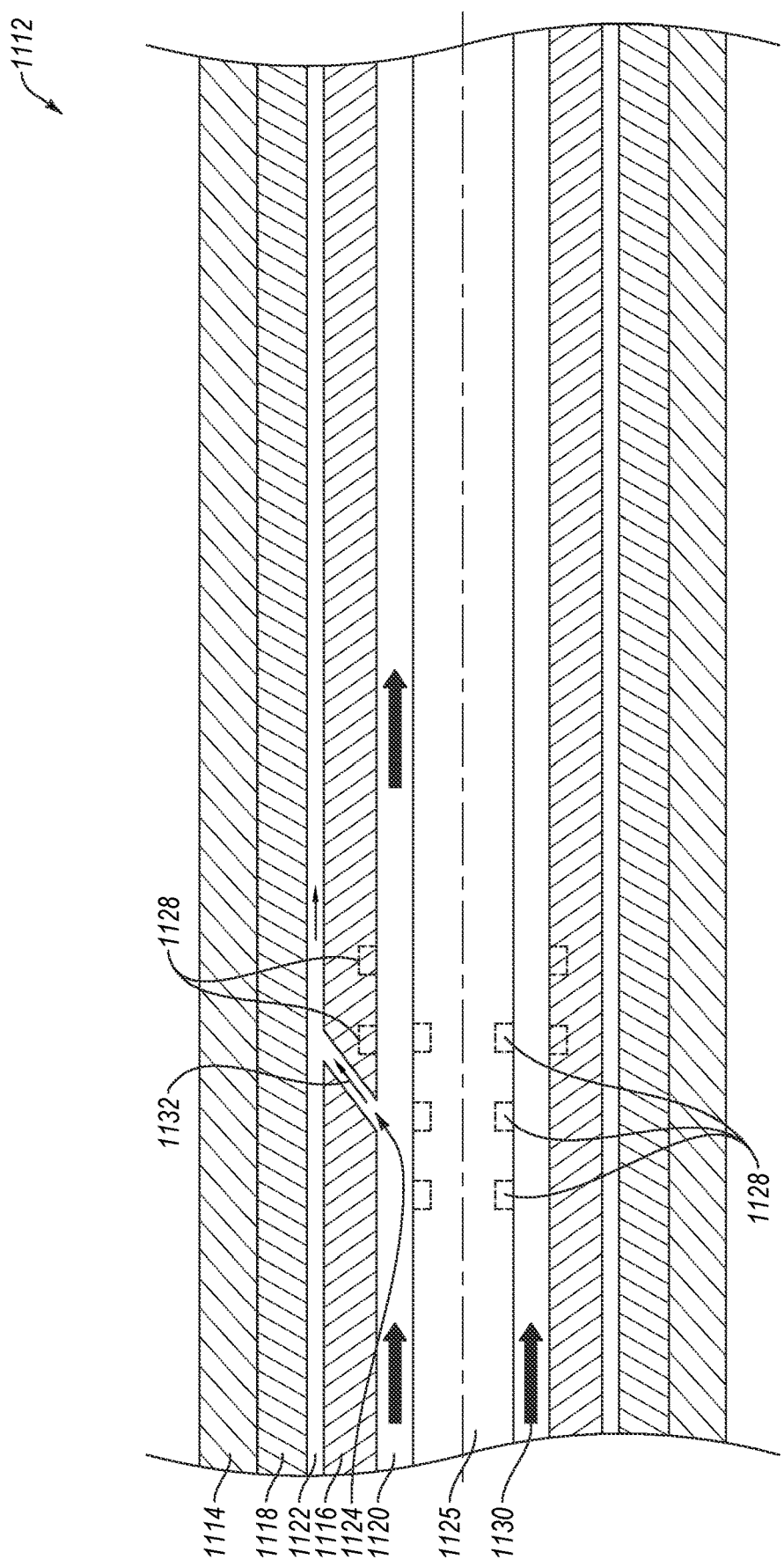
FIG. 11 is a cross-sectional view of a downhole motor including a magnet, according to at least one embodiment of the present disclosure.

While FIGS. 2-10 describe a downhole motor that includes a rotor that is within a housing and is rotatable around a stator, other embodiments contemplate a downhole tool, downhole generator, downhole motor, or other tool in which a rotor is positioned inside a stator and rotates relative to the stator to generate power or for other purposes. FIG. 11, for instance, is a cross-sectional view of a downhole motor 1112 according to at least one embodiment of the present disclosure. The downhole motor 1112 includes a rotor 1116 and a stator 1118 inside a housing 1114. Although shown separately in FIG. 11, in some embodiments the stator 1118 may be part of or may form the housing 1114.

A fluid flow 1130 of drilling fluid passing through a primary fluid path 1120 inside the rotor 1116 and may engage one or more fins on the rotor 1116 to rotate the rotor 1116. Rotation of the rotor 1116 within the stator 1118 can be used, for example, to generate power and can be lubricated by a portion 1132 of the fluid flow 1130 of drilling fluid that is directed away from the primary fluid path 1120 into a secondary fluid path 1122 that is radially outward relative to the primary fluid path 1120, and in this embodiment is in the annular space between the outer surface of the rotor 1116 and the inner surface of the stator 1118. The redirected portion 1132 of the drilling fluid enters the secondary fluid path 1122 at a secondary inlet 1124 that extends in an at least partially radial direction. In the illustrated embodiment, the secondary inlet 1124 directs flow radially outwardly and axially downhole/downstream, although in other embodiments the secondary inlet 1124 may direct flow radially outwardly and axially uphole/upstream or may direct flow primarily radially outwardly.

As also shown in FIG. 11, one or more magnets 1128 may be coupled to the rotor 1116 and may have a magnetic field that attracts magnetic particles in the primary flow path 1120. The one or more magnets may therefore bias the magnetic particles away from the secondary fluid path 1122, thereby limiting or even preventing accumulation of magnetic particles in the secondary fluid path 1122. By reducing or eliminating magnetic particles in the secondary fluid path 1122, the efficiency or operation of the motor 1112 may be maintained.

As shown in dashed lines, the one or more magnets 1128 may be positioned in the rotor 1116 and downstream of the secondary inlet 1124. In the same or other embodiments, the one or more magnets 1128 may be in other locations, including in a sleeve, collar, or other component 1125 inside the rotor 1116. The one or more magnets 1128 may be annular in shape or be positioned at discrete circumferential positions.

Figure 12:
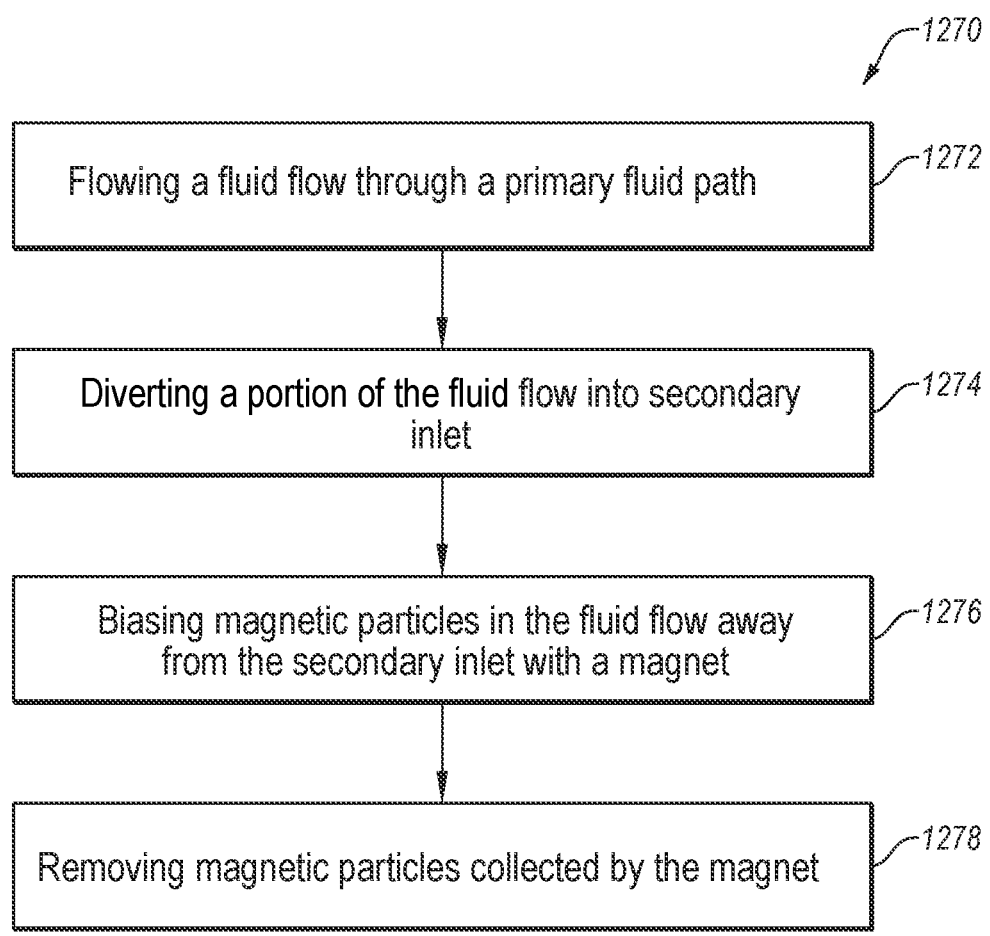
FIG. 12 is a flowchart of a method for generating power, according to at least one embodiment of the present disclosure.

FIG. 12 is a flowchart of a method 1270 for operating a downhole motor, according to at least one embodiment of the present disclosure. The method 1270 may include flowing a fluid flow through a primary fluid path to rotate a rotor of a downhole motor at 1272. The primary fluid path is optionally located between a housing of the downhole motor and the rotor but may also be inside a rotor. A portion of the fluid flow may be diverted into a secondary inlet at 1274. The portion of the fluid flow may be diverted radially into a secondary fluid path to lubricate the motor. The secondary fluid path may be located between the rotor and the stator. A magnet may attract magnetic particles in the fluid flow and bias flow of the particles away from the secondary inlet at 1276.

In some embodiments, the method 1270 may further include removing collected magnetic particles or accumulated magnetic particles off the magnet at 1278. Removing the collected magnetic particles at 1278 may include using the fluid flow to erode or wear away the collected magnetic particles or accumulated magnetic particles off the magnet. In some embodiments, removing the collected magnetic particles at 1278 may include scraping the collected magnetic particles off the magnet with a scraper. In some embodiments, the magnet may include an electromagnet, and removing the collected magnetic particles may include periodically shutting down or removing power from the electromagnet.

The embodiments of the downhole tools herein have been primarily described with reference to wellbore drilling operations; however, the downhole motors, power generators, and other tools described herein may be used in applications other than the drilling of a wellbore. In other embodiments, downhole tools according to the present disclosure may be used outside a wellbore or other downhole environment used for the exploration or production of natural resources. For instance, downhole tools of the present disclosure may be used in a borehole used for placement of utility lines or may be used in other industries including machining operations. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. For example, the numbers, placements, and orientations of magnets and inlets may be used in any combination of a tool. Additionally, numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" and "above" and "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A downhole power generation system, comprising:
    a housing;
    a rotor in the housing;
    a stator;
    a primary fluid path between the rotor and the housing;
    a secondary fluid path having a secondary inlet in the primary fluid path, the secondary fluid path being between the rotor and the stator; and
    a magnet proximate the secondary inlet, wherein the magnet being positioned in the primary fluid path.

2. The downhole power generation system of claim 1, the magnet being a permanent magnet.

3. The downhole power generation system of claim 1, the magnet being on the rotor.

4. The downhole power generation system of claim 1, the magnet being on an inner surface of the housing.

5. The downhole power generation system of claim 4, the magnet positioned upstream of the secondary inlet.

6. The downhole power generation system of claim 1, the secondary inlet positioned upstream of the rotor.

7. The downhole power generation system of claim 1, further comprising a scraper configured to clean away magnetic particles accumulated by the magnet.

8. A downhole motor, comprising:
    a primary fluid path located between a housing and a rotor, wherein flow of a fluid through the primary fluid path is configured to rotate the rotor;
    a secondary fluid path between the rotor and a stator, the secondary flow path being directed from the primary fluid path at a secondary inlet; and
    a magnet located downstream of the secondary inlet, wherein the magnet having a zone of influence that overlaps the secondary inlet.

9. The downhole motor of claim 8, the magnet having a zone of influence that extends to an inner surface of the housing.

10. The downhole motor of claim 8, the magnet having a zone of influence that extends into the secondary fluid path.

11. The downhole motor of claim 8, the magnet being an electromagnet.

12. The downhole motor of claim 8, the magnet including a plurality of circumferentially spaced magnets.

13. The downhole motor of claim 8, the magnet being a first magnet, and further comprising a second magnet located downstream of the first magnet.

14. A method for generating power, comprising:
    rotating a rotor by flowing a fluid through a primary fluid path, the primary fluid path being located radially between a housing and the rotor or within the rotor;
    lubricating the rotor by diverting a portion of the fluid radially from the primary fluid path into a secondary inlet and through a secondary fluid path, the secondary fluid path being located radially between the rotor and a stator;
    biasing magnetic particles in the fluid flow away from the secondary inlet with at least one magnet; and
    removing accumulated magnetic particles from the at least one magnet.

15. The method of claim 14, wherein removing the accumulated magnetic particles from the at least one magnet includes using the fluid flowing in the primary fluid path to erode magnetic particles from the accumulated magnetic particles.

16. The method of claim 14, wherein removing the accumulated magnetic particles includes scraping the accumulated magnetic particles from the at least one magnet with a scraper.

17. The method of claim 14, wherein the at least one magnet is an electromagnet, and wherein removing the accumulated magnetic particles includes one or more periods of removing power to the electromagnet.

* * * * *